United States Patent [19]

Schaffner et al.

[11] Patent Number: 4,941,692
[45] Date of Patent: Jul. 17, 1990

[54] ADHESIVE CONNECTION OF TUBES FORMED OF CARBON OR GRAPHITE

[75] Inventors: Kurt Schaffner, Augsburg; Adolf Swozil, Kühlenthal; Gerhard Ullmann, Gross-Gerau, all of Fed. Rep. of Germany

[73] Assignee: SIGRI GmbH, Meitingen, Fed. Rep. of Germany

[21] Appl. No.: 355,406

[22] Filed: May 22, 1989

[30] Foreign Application Priority Data

May 27, 1988 [DE] Fed. Rep. of Germany ....... 3818066

[51] Int. Cl.⁵ .............................................. F16L 13/04
[52] U.S. Cl. .................................... 285/114; 285/293; 285/423; 285/915
[58] Field of Search ............... 285/915, 423, 347, 417, 285/369, 114, 292, 293, 332

[56] References Cited

U.S. PATENT DOCUMENTS

| | | |
|---|---|---|
| 662,618 | 11/1900 | Camp .................................. 285/243 |
| 2,782,806 | 2/1957 | Stambaugh et al. . |
| 2,795,440 | 6/1957 | Holycross et al. . |
| 2,807,282 | 2/1954 | Watts et al. . |
| 3,239,403 | 3/1966 | Williams et al. ............... 285/915 X |
| 3,756,631 | 9/1973 | Ross et al. ...................... 285/423 X |
| 4,474,233 | 10/1984 | Swozil . |
| 4,624,486 | 11/1986 | Nishino et al. ..................... 285/292 |

FOREIGN PATENT DOCUMENTS

| | | |
|---|---|---|
| 1049171 | 1/1959 | Fed. Rep. of Germany . |
| 1053260 | 9/1959 | Fed. Rep. of Germany . |
| 3116309 | 5/1985 | Fed. Rep. of Germany . |
| 1423092 | 11/1965 | France ................................. 285/369 |

*Primary Examiner*—Dave W. Arola
*Attorney, Agent, or Firm*—Herbert L. Lerner; Laurence A. Greenberg

[57] ABSTRACT

Carbon or graphite tubes which are mutually connected by an adhesive connection are less stressable than individual tubes. A sleeve formed of fibers and impregnated with a thermoplast is pulled onto the connection position. The new connection increases the stressability of connected tubes. The thermoplast limits the build up of stressing so that the reduction factor of the strength of the connection amounts only to 10 to 15%.

7 Claims, 1 Drawing Sheet

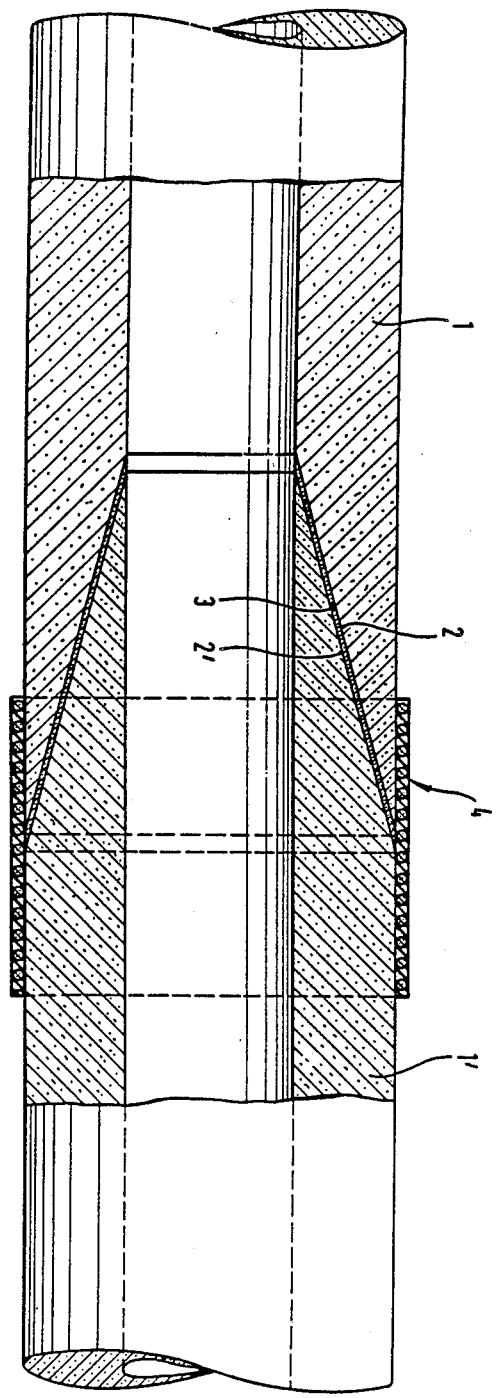

ADHESIVE CONNECTION OF TUBES FORMED OF CARBON OR GRAPHITE

SPECIFICATION

The invention relates to an adhesive connection of carbon or graphite tubes by means of a sleeve formed of fibers surrounding the bonding position.

In the connection of tubes and cylinders formed of carbon or graphite, which can only be produced in comparatively short lengths and frequently must be combined to greater lengths in use, it is known to provide tapered ends of the tubes with threads and to screw in box couplings likewise formed of carbon and graphite. The box coupling connection is less suitable, especially for thin walled tubes, since stress points are formed as a result of the sudden increase of the thickness of wall at the transition between the tube wall and the box coupling, which necessarily has a greater external diameter than the tube. The strength of the connection is significantly weakened as a result and the reduction factor amounts to up to 50%. Carbon or graphite tubes are also connected with one another by adhesive or cement connections. The tube ends are generally tapered or profiled with this type of connection and coated with an adhesive or cement usually containing a hardenable synthetic resin, which is hardened after inserting the tubes together. With merely tapered tubes, an accumulation of the cement along the intersection line of taper and the tube jacket when pushing together may not be avoided and there is an undesired variation in the connection strength having a reduction factor which on average likewise amounts to about 50%. A greater and less strongly varying connection strength is obtained with tubes having ends that are profiled in an S-shape, as disclosed in German Patent No. DE-PS 10 53 260, corresponding to U.S. Pat. No. 2,795,440. The connection, which has a reduction factor that amounts to about 30 to 40%, contains a cement pocket in the mold formed by a surrounding gap. The pocket is bounded by contact lines of the two tubes.

Carbon and graphite are comparatively brittle materials and tubes formed essentially of carbon and graphite are especially sensitive to impact-like stresses. It is known to reinforce carbon and graphite tubes by means of woven fabric sleeves, e.g. formed of glass-fiber mats, as disclosed in German Published, Prosecuted Application No. DE-AS 10 49 171, corresponding to U.S. Pat. No. 2,807,282 or to wrap the tubes with pretensioned graphite yarn, as disclosed in German Patent No. DE-PS 31 16 309, corresponding to U.S. Pat. No. 4,474,233 and to connect sleeves and tubes force lockingly by means of synthetic resin bridges. A force-locking connection is one which connects two elements together by force external to the elements, as opposed to a form-locking connection which is provided by the shapes of the elements themselves. Sleeves or wrappings extending over the adhesive or cement positions of tubes which are connected with one another increase the strength of the connection without the breaking strength of the reinforced tubes being reached. A reduction factor of 30 to 50% does not permit the complete use of the tube strength. It is also known to bond the ends of a graphite tube covered with a fabric sleeve by means of a graphite flange, as disclosed in U.S. Pat. No. 2,782,806. The sleeve in that case is embedded directly in the cement layer and although a significant improvement of the bond strength is achieved, one does not achieve the breaking strength of unreinforced tubes.

A common feature of the connections in all of the publications is the large reduction factors which essentially restricts the mechanical loading capacity of connected tubes and actually does so to amounts far below the breaking load of the individual tube. Connections with S-shaped profiled bonding surfaces behave comparatively satisfactorily, but require a comparatively large production cost.

It is accordingly an object of the invention to provide an adhesive connection of tubes formed of carbon or graphite, which overcomes the hereinafore-mentioned disadvantages of the heretofore-known devices of this general type and which has a high strength without a higher operating cost, that can be stressed like the individual tubes.

With the foregoing and other objects in view there is provided, in accordance with the invention, an adhesive connection of conical end surfaces of carbon or graphite tubes, comprising a sleeve formed of fibers and being impregnated with a thermoplast, the sleeve surrounding a given bonding, adhesion or gluing position of conical end surfaces of two carbon or graphite tubes.

The ends of the tubes to be connected are in the form of complementary conical surfaces having an inclination with respect to the longitudinal axis of the tube that amounts to about 15° to 60°. After coating the surfaces with adhesive or cement, the tube ends are pushed together with some adhesive or cement emerging from the adhesive joint at the line of intersection with the tube walls. The accumulation of cement and the break out from the edges running to a point are the essential weak points of the connection which, according to the invention, are compensated for by means of a sleeve impregnated with a thermoplast surrounding the connection position. In particular the build up of stress points is prevented so that the reduction factor is comparatively small at 10 to 15% and the connected carbon and graphite tubes can be stressed like individual tubes with reference to the usual safety margins.

The adhesives or cements used for production of the connection are formed of a finely particulate or powdered carbon material e.g. carbon black or graphite, and about 20 to 40% of hardenable resins as a binder. Phenol-aldehyde resins or furan resins to which hardening catalysts are optionally added are advantageously used as a binder. The plasticity of the adhesive or cement is adjusted to the respective adhesive properties by the addition of plasticizing agents. In order to harden of the resin components, the connection positions are advantageously heated to 120° to 180° C. and kept at these temperatures for about 4 to 12 hours. Cements containing catalysts already harden due to age hardening at room temperature.

In accordance with an another feature of the invention, the length of the sleeve is greater than the diameter of the tube.

After hardening the resin, the sleeve formed of fibers with a length that is greater than the tube diameter, is pulled onto the tubes, with the sleeve surrounding the bonding, gluing or adhesive position. Sleeves with a smaller length less effectively prevent the build up of stress points in and at the adhesion positions. The sleeve itself is formed of fibers which have a tensile strength and stiffness that are as great as possible and are stable at the temperatures of use of the carbon and graphite tubes. Examples are glass fibers, arylamide fibers and, in accordance with a further feature of the invention, carbon fibers which are preferred due to of their good corrosion resistance. The sleeves are formed of woven fabrics or webs of these fibers or of yarns which are wrapped on the tubes.

The bonding between the sleeve and the tube walls is essential for the effectiveness of the reinforcement. A very rigid connection is obtained with hardenable resins like phenol-aldenyde resins, furan resins as well as epoxide resins which are applied on the tube jacket below the sleeve or by impregnation of the sleeve and are hardened. Due to the great brittleness of the hardened layer, a greater reduction of stress is apparently not possible. Surprisingly, thermoplasts with which the sleeves are impregnated behave more satisfactorily and thermoplasts may be more easily shaped and in particular absorb the shearing strains which are harmful for the connection.

In accordance with an added feature of the invention, the thermoplast impregnated in the sleeve is a fluorine-containing thermoplast. Due to the satisfactory temperature and corrosion resistance thereof, fluorine-containing thermoplasts, e.g. polyvinylidene fluoride are particularly suitable as impregnating agents.

In accordance with an additional feature of the invention, the thermoplast impregnated in the sleeve is a perfluorinated propylvinylether copolymer. Perfluorinated propylvinylether copolymers (TFA), which are simple to work with and wet the fiber structure of the sleeve well, are preferred.

In accordance with a concomitant feature of the invention, the sleeve is wound or wrapped around the tubes.

Other features which are considered as characteristic for the invention are set forth in the appended claims.

Although the invention is illustrated and described herein as embodied in an adhesive connection of tubes formed of carbon or graphite, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a fragmentary, diagrammatic, partly broken-away and sectional view of graphite tubes through which the invention will be explained by way of example.

Referring now in detail to the single FIGURE of the drawing, there are seen graphite tubes 1, 1' having end surfaces 2, 2' which are complementary conical surfaces. A gap between the surfaces is filled with cement material 3 which is formed of a mixture containing a phenol formaldehyde resin, carbon black and graphite. A sleeve or collar 4 formed of carbon fibers is wrapped over the tubes, which have an outside diameter of 37 mm and an inside diameter of 25 mm. The sleeve is impregnated with a thermoplast such as TFA.

In order to test the connection strength, the connected tubes were stressed by bending (in a 4 point bending experiment), as shown below in Sample (C). For comparison, the breaking strength of a graphite tube was measured in Sample (A) and the breaking strength of glued tubes without a sleeve was measured in Sample (B).

| Sample | Breaking strength MPa | Reduction factor % |
|--------|----------------------|--------------------|
| A      | 45                   | —                  |
| B      | 23                   | 48                 |
| C      | 39                   | 13                 |

The foregoing is a description corresponding in substance to German Application No. P 38 18 066.9, dated May 27, 1988, the International priority of which is being claimed for the instant application, and which is hereby made part of this application. Any material discrepancies between the foregoing specification and the aforementioned corresponding German application are to be resolved in favor of the latter.

We claim:

1. Adhesive connection of conical end surfaces of carbon or graphite tubes, comprising a sleeve formed of fibers and being impregnated with a thermoplast, said sleeve surrounding a given bonding position of two carbon or graphite tubes and being bonded to said tubes, said tubes having conical end surfaces being fitted and adhesively attached together at said given bonding position.

2. Adhesive connection according to claim 1, wherein said thermoplast impregnated in said sleeve is a fluorine-containing thermoplast.

3. Adhesive connection according to claim 1, wherein said thermoplast impregnated in said sleeve is a perfluorinated propylvinylether copolymer.

4. Adhesive connection according to claim 1, wherein the length of said sleeve is greater than the diameter of the tube.

5. Adhesive connection according to claim 1, wherein said sleeve contains carbon fibers.

6. Adhesive connection according to claim 1, wherein said sleeve is wound around the tubes.

7. Combination of carbon or graphite tubes and an adhesive connection of the tubes, comprising two carbon or graphite tubes having conical end surfaces being adhesively fitted together at a given bonding position, and a sleeve formed of fibers being impregnated with a thermoplast and surrounding said given bonding position and bonded to said tubes.

* * * * *